United States Patent
Luo et al.

(10) Patent No.: US 10,761,228 B2
(45) Date of Patent: Sep. 1, 2020

(54) METHOD TO CALCULATE ACQUISITION ILLUMINATION

(71) Applicants: China Petroleum & Chemical Corporation, Beijing (CN); Sinopec Tech Houston, LLC., Houston, TX (US)

(72) Inventors: Mingqiu Luo, Houston, TX (US); Ning Dong, Houston, TX (US)

(73) Assignee: CHINA PETROLEUM & CHEMICAL CORPORATION, Beijing (CN)

(*) Notice: Subject to any disclaimer, the term of this patent is extended or adjusted under 35 U.S.C. 154(b) by 412 days.

(21) Appl. No.: 15/853,447

(22) Filed: Dec. 22, 2017

(65) Prior Publication Data

US 2018/0180756 A1 Jun. 28, 2018

Related U.S. Application Data

(60) Provisional application No. 62/438,955, filed on Dec. 23, 2016.

(51) Int. Cl.
*G01V 1/28* (2006.01)
*G01V 1/50* (2006.01)
(Continued)

(52) U.S. Cl.
CPC ............ *G01V 1/28* (2013.01); *G01V 1/375* (2013.01); *G01V 1/50* (2013.01); *G01V 1/30* (2013.01);
(Continued)

(58) Field of Classification Search
CPC . G01V 1/28; G01V 1/375; G01V 1/50; G01V 1/30; G01V 2210/675; G01V 2210/679
See application file for complete search history.

(56) References Cited

U.S. PATENT DOCUMENTS

| | | | | |
|---|---|---|---|---|
| 5,693,885 A | * | 12/1997 | Neidell | G01S 13/89 73/597 |
| 6,131,070 A | * | 10/2000 | Ferber | G01V 1/003 702/14 |

(Continued)

OTHER PUBLICATIONS

Xie et al., "A full-wave equation based seismic illumination analysis method", 70th EAGE Conference & Exhibition, Rome, Italy (Year: 2008).*

(Continued)

*Primary Examiner* — Ian J Lobo
(74) *Attorney, Agent, or Firm* — Novick, Kim & Lee, PLLC; Allen Xue

(57) ABSTRACT

New methods for calculating acquisition illumination are computationally less expensive in comparison with conventional methods. In one such new method, source wavefield propagations are calculated and assigned to corresponding zero-offset receivers. Further, the number of non-zero-offset receivers within the coverage of the shot at the source location is decimated. Such a method is most advantages in reverse time migration, in which all source wavefield propagations are already calculated. The receiver-side illumination for each shot can be obtained by summing up all the source-side illumination with the source located within receiver coverage. All the source-side illumination and receiver-side illumination can be summed up to get the acquisition illumination for the survey. The acquisition illumination can be used to value the acquisition system and to compensate the migration images.

17 Claims, 3 Drawing Sheets

(51) Int. Cl.
*G01V 1/30* (2006.01)
*G01V 1/37* (2006.01)

(52) U.S. Cl.
CPC .......... *G01V 2210/1299* (2013.01); *G01V 2210/1425* (2013.01); *G01V 2210/675* (2013.01); *G01V 2210/679* (2013.01)

(56) References Cited

U.S. PATENT DOCUMENTS

| 2004/0054477 A1* | 3/2004 | Bernitsas | G01V 1/20 702/14 |
| 2007/0104028 A1* | 5/2007 | Van Manen | G01V 1/36 367/38 |
| 2011/0176386 A1* | 7/2011 | Lapilli | G01V 1/282 367/73 |
| 2012/0221248 A1* | 8/2012 | Yarman | G01V 1/282 702/16 |

OTHER PUBLICATIONS

Yan et al, "Full-wave seismic illumination and resolution analysis: A Poynting-vector-based method", Geophysics, vol. 81, No. 6 (Year: 2016).*

* cited by examiner

A - A sectional veiw

METHOD TO CALCULATE ACQUISITION ILLUMINATION

CROSS-REFERENCE TO RELATED APPLICATION

This application claims priority to U.S. Provisional Patent Application having Ser. No. 62/438,955, filed Dec. 23, 2016, which is incorporated herein by reference in its entirety.

FIELD OF TECHNOLOGY

The present disclosure relates generally to a method for collecting and processing seismic data as well as seismic acquisition design. More specifically, the present disclosure provides a method to obtain acquisition illumination with a lower computational cost, especially when used in reverse time migration.

BACKGROUND

Seismology is used for exploration, archaeological studies, and engineering projects that require geological information. Exploration seismology techniques are used widely in the oil and gas industry in the exploration to identify prospects and types of geologic formations. In order to apply a seismic investigation of a geological area, the seismic data shall be acquired based on an optimal seismic acquisition system that defines the source and receiver locations for all the shots. With the seismic data as well as seismic processing and imaging techniques are deployed to generate subsurface images of the geologic area for interpretation.

Acquisition illumination is widely used to evaluate the acquisition system capability in acquiring the reflection information for subsurface structures. It also can be used to compensate the seismic image in order to minimize the effect of unbalanced illumination on subsurface structures. Acquisition illumination is a combination of effects from source and receiver locations for all the shots, subsurface structures of the model, and model properties. The calculation of acquisition illumination requires calculating both the source-side illumination and the receiver-side illumination for all the shots in the acquisition system, which typically involves a large amount of computations for production applications.

Reverse Time Migration (RTM) is the most advanced seismic imaging method. It is widely used in seismic processing in oil and gas industry as a standard advanced imaging method. The basic concept of RTM includes three parts, which are 1) simulating the source propagation, i.e., propagating forwards in time; 2) back-propagating the receiver records, i.e., propagating backwards in time; and 3) applying cross-correlation image condition with source and receiver wavefields at each time step during the propagation. Since the simulation of source and receiver wave propagations and applying image condition require a large amount of numerical computation, RTM is a computationally intensive process.

Acquisition illumination can be used to further improve imaging quality output from RTM as a compensation for the acquisition and complex structure effect. In the implementation of RTM, the source-side wavefield for each shot will be calculated. The source-side wavefield can be used to generate source-side illumination by summing up all the source-side wavefields for all the time steps. However, there is no receiver-side wavefield calculated for each receiver in RTM processing so that RTM cannot output receiver-side illumination. Accordingly, acquisition illumination during RTM processing still needs improvement. The current disclosure provides solutions to solve this issue.

SUMMARY

The present disclosure provides a method to output acquisition illumination during RTM processing. This method employs the source-side wavefield generated in regular RTM processing and therefore reduces the computational costs and time for outputting an acquisition illumination in a seismic processing production project. The solution in generating acquisition offered by this disclosure enables the utilization of acquisition illumination to compensate the seismic image output by RTM and in analyzing the seismic acquisition system.

The acquisition illumination calculation for a full survey typically includes calculating illumination for each single shot and summation of the illumination for all the shots to get the acquisition illumination for the survey. The illumination calculation for a single shot typically includes the calculation of source-side illumination (which can be obtained from the Green's function at the source location) and the calculation of receiver-side illumination (which are the summation of all the receivers' illumination). The receiver illumination can be obtained from the Green's function at the receiver location.

In one of the embodiment of the current disclosure, a method for seismic acquisition illumination has the following steps. First, a plurality of source locations and a plurality of receivers are placed in a survey field. The receivers include one or more zero-offset receivers. Each zero-offset receiver is placed at one of the plurality of source locations. I.e., the location of each zero-offset receiver coincides with a source location. Conversely, a receiver that is not located at a source location is a non-zero-offset receiver. Further, at least one shot is deployed at each of the plurality of source locations. Each shot generates seismic waves that cover a volume of earth formation. The receivers collect seismic signals reflected from the volume of earth formation.

In addition, the source wavefield propagation is calculated for each of the plurality of source locations. The illumination of each of the plurality of source locations is calculated according to equation (4):

$$D_{s_i} \approx G_{s_i}^2 * \Sigma_{j=1}^{Ns_i}(G_{s_j}^2) \qquad (4),$$

wherein $G_{s_i}$ is the wavefield propagation of the source location, $Ns_i$ the number of source locations positioned in the volume of earth formation, and $G_{s_j}$ is the wavefield propagation of each source location positioned in the volume of earth formation. Finally, the illuminations of all of the plurality of source locations are summed up to obtain the illumination of the survey field.

In another embodiment of this disclosure, the method for seismic acquisition illumination calculation includes the step of performing reverse time migration (RTM) of seismic signals in a seismic survey. The seismic survey deploys a plurality of shots at a corresponding number of source locations and a plurality of receivers in a survey field. The wavefield propagation for each of the plurality of source locations is calculated and assigned to be the wavefield propagation for a zero-offset receiver coincides with its corresponding source location.

Further, the illumination of each of the plurality of source locations is calculated according to equation (3):

$$D_{s_i} \approx G_{s_i}^2 * \sum_{j=1}^{\frac{Nri}{mx*my}} (G_{r_j}^2) \quad (3)$$

$D_{s_i}$ is an illumination for a single shot which is a 3D volume having a grid size (Nx, Ny, Nz) in the xyz coordinate system, $G_{si}$ and $G_{rj}$ are respectively the wavefield propagation of the source location and the wavefield propagation of the receivers in the 3D volume, $Nr_i$ is a total number of receivers located in the 3D volume, $m_x$ and $m_y$ are decimation factors in X- and Y-directions. Finally, illuminations of all of the plurality of source locations are summed up to obtain the illumination of the survey field.

In a further embodiment, $m_x$ and $m_y$ are integers larger than one, provided that a value of $$\frac{Nri}{mx*my}$$

is an integer of one or larger than one.

In still another embodiment, $$\frac{Nri}{mx*my}$$

is a number of source locations in the 3D volume, which is also the number of zero-offset receivers in the same 3D volume.

DETAILED DESCRIPTION

Figure 1A:
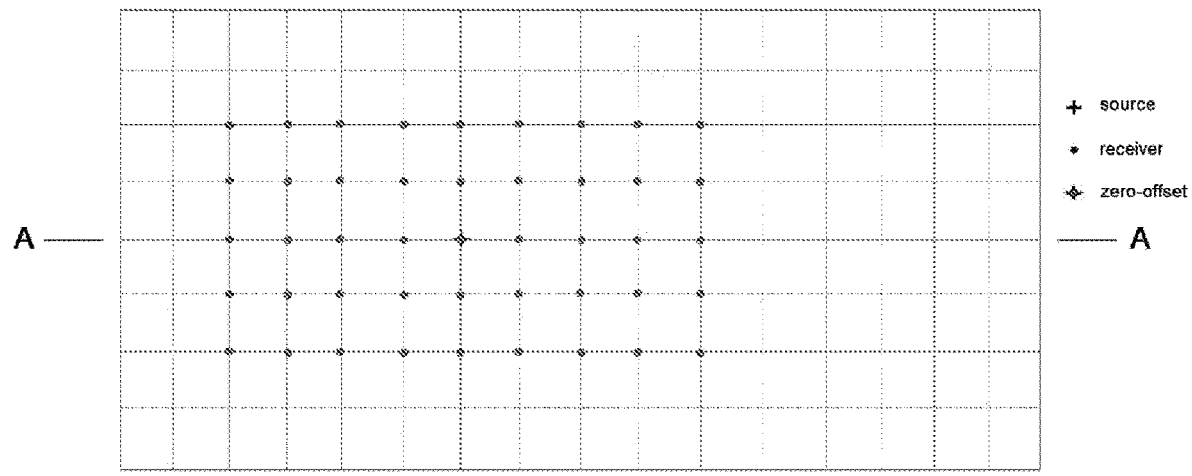
FIG. 1a is the source and receiver location map for a single shot in a typical seismic acquisition system.

The present disclosure provides a method involving steps that may be described and implemented in the general context of a system and computer methods to be executed by a computer. Such computer-executable instructions may include programs, routines, objects, components, data structures, and computer software technologies that can be used to perform particular tasks and process abstract data types. Software implementations of the present disclosure may be coded in different languages for application in a variety of computing platforms and environments. It will be appreciated that the scope and underlying principles of the present disclosure are not limited to any particular computer software technology.

Moreover, those skilled in the art will appreciate that the present disclosure may be practiced using any one or combination of hardware and software configurations, including but not limited to a system having single and/or multiple computer processors, hand-held devices, programmable consumer electronics, mini-computers, mainframe computers, and the like. The disclosure may also be practiced in distributed computing environments where tasks are performed by servers or other processing devices that are linked through a one or more data communications network. In a distributed computing environment, program modules may be located in both local and remote computer storage media including memory storage devices.

The Figures (FIG.) and the following description relate to the embodiments of the present disclosure by way of illustration only. It should be noted that from the following discussion, alternative embodiments of the structures and methods disclosed herein will be readily recognized as viable alternatives that may be employed without departing from the principles of the claimed disclosures.

Referring to the drawings, embodiments of the present disclosure will be described. Various embodiments can be implemented in numerous ways, including for example as a system (including a computer processing system), a method (including a computer implemented method), an apparatus, a non-transitory computer readable medium, a computer program product, a graphical user interface, a web portal, or a data structure tangibly fixed in a non-transitory computer readable memory. Several embodiments of the present disclosure are discussed below. The appended drawings illustrate only typical embodiments of the present disclosure and therefore are not to be considered limiting of its scope and breadth.

Reference will now be made in detail to several embodiments of the present disclosure(s), examples of which are illustrated in the accompanying figures. It is noted that wherever practicable similar or like reference numbers may be used in the figures and may indicate similar or like functionality. The figures depict embodiments of the present disclosure for purposes of illustration only. One skilled in the art will readily recognize from the following description that alternative embodiments of the structures and methods illustrated herein may be employed without departing from the principles of the disclosure described herein.

Figure 1B:
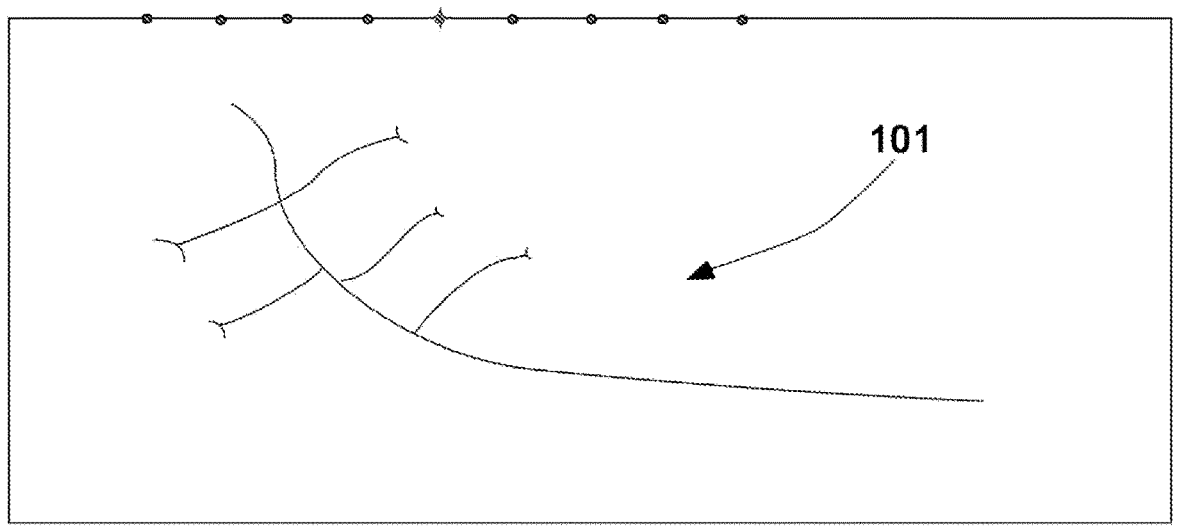
FIG. 1b is the sectional view of the A-A plane in FIG. 1a, showing the positional relations among the source, the receivers, and the subsurface structure in a formation under investigation.

FIG. 1a schematically illustrates a map showing the source and the receivers for a single shot seismic acquisition. FIG. 1b is a sectional view along the A-A plane in FIG. 1a, showing one row of receivers and the source on the surface as well as a subsurface structure 101. Note that the source and one of the receivers are located in the same location. Such a receiver is a zero-offset receiver as its distance to the source is zero. The shot can be explosives, gas or air guns, weight drop mechanisms, vibrator systems, etc. The receivers, i.e., sensors, can be geophones for land survey or hydrophones for underwater survey.

In a seismic acquisition, a shot is deployed at the source location, generating a wavefield that propagates from the source to the subsurface structure 101. The reflection from the subsurface structure 101 propagates back to the surface and is detected by the receivers, including the zero-offset receiver. The receivers convert the seismic signals to voltage signals. The voltage signals are then transmitted to a computer in a recording station (not shown) to be processed and converted into seismic data. The seismic data can be stored and transmitted, or further processed. Note that the wavefield generated by one shot covers a 3D volume and the reflection propagates to the receivers that cover that 3D volume.

As such, seismic acquisition from a single shot collects seismic data from the 3D volume of earth formation that the seismic wave covers. A large number of such single shots are deployed at different source locations across the survey field, each covering its own specific 3D volume of earth formation so that a large volume of earth formation is investigated one specific 3D volume at one time.

The acquisition illumination for a single shot can be calculated using source wavefield propagation. The source wavefield propagation can be represented by its Green's function. As such, the acquisition illumination can be defined as the square of the Green's function of source location multiply by the summation of the square of the Green's functions for all receivers. It can be expressed as equation (1):

$$D_{s_i} = G_{s_i}^2 * \Sigma_{j=1}^{Nri}(G_{r_j}^2) \quad (1)$$

Here $D_{s_i}$ is the illumination for a single shot that covers a 3D volume having a grid size (Nx, Ny, Nz) in a xyz coordinate system. This 3D volume can be viewed as a physical volume that the single shot covers as well as a data volume of seismic data collected from the physical volume. $G_{s_i}$ is the Green's function of the source location of this 3D volume. $G_{r_j}$ is the Green's function of a receiver in this same 3D volume, e.g., covering an area the size of NxNy. For a single shot, $Nr_i$ is the number of receivers used for the shot in the same 3D volume.

Figure 2:
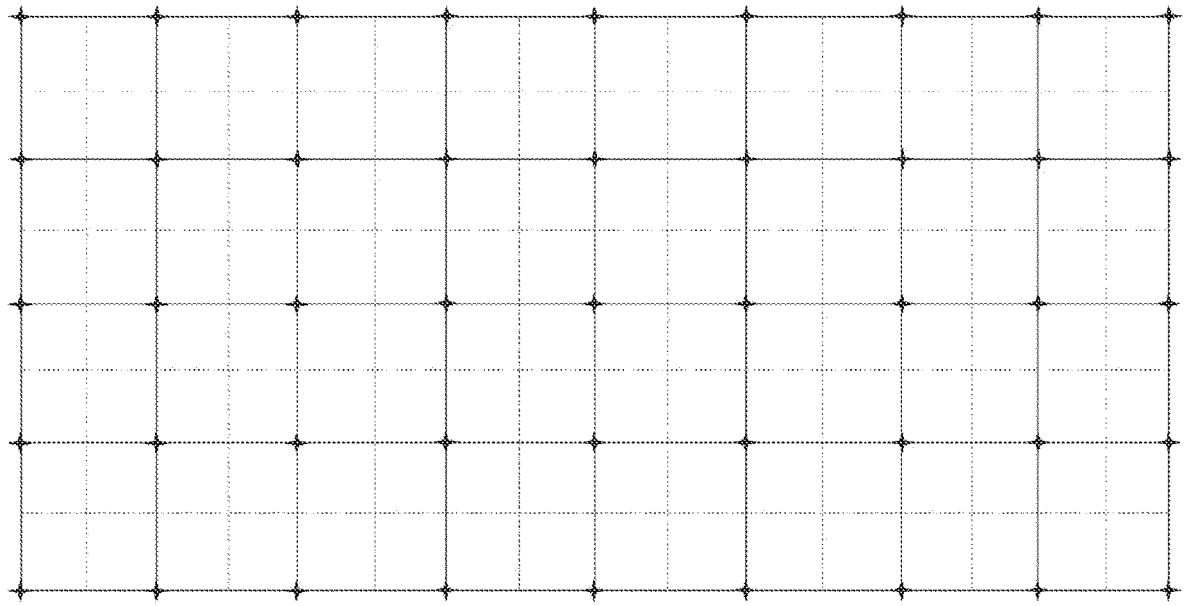
FIG. 2 is the source location map for all the shots in a seismic acquisition system.

FIG. 2 illustrates an array of (9×5) shots covering the survey area. An actual survey may involve thousands of shots. The acquisition illumination for the survey is defined as the summation of acquisition illuminations of all the shots. It can be written as:

$$D = \Sigma_{i=1}^{Ns} D_{s_i} \quad (2)$$

Here D is the acquisition illumination of the survey. Ns is the total number of shots deployed in the survey. The survey volume is the sum of all the 3D volumes covered by all the shots in the survey.

A conventional acquisition illumination calculation simulates the Green's function for each source and receiver in the survey, then follows equations (1) and (2) to obtain the acquisition illumination.

Figure 3:
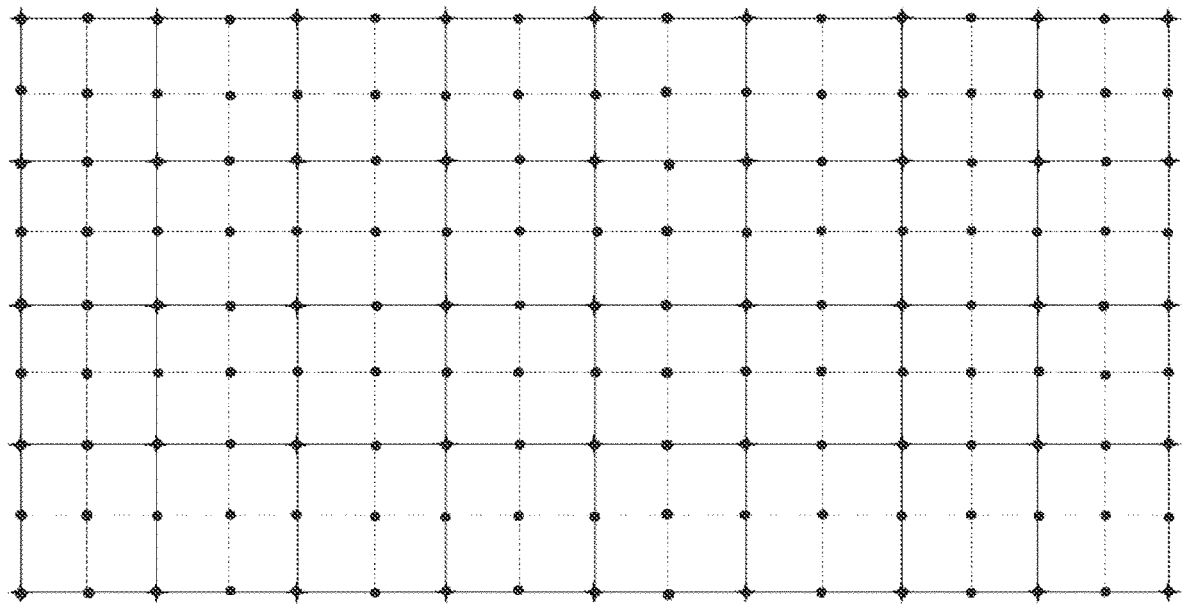
FIG. 3 is the source and receiver location map for all the shots in a seismic acquisition system.

Typically a large number shots and associated receivers are employed in a survey. FIG. 3 illustrates a grid having the array of (9×5) sources and an array of (17×9) receivers. In this case, the interval between the receivers is twice as large the interval between the source locations. Note that each source location coincides with a zero-offset receiver.

For a 900-square km survey, assuming one shot is deployed every 50 m in the X-direction and every 200 m in the Y-direction, and assuming a receiver interval of 25 m in both the X- and Y-directions, the total number of sources and receivers locations would be 1.44 million. Each shot generates 130,321 seismic traces. To obtain the acquisition illumination for the whole survey field using the conventional method illustrated in equations (1) and (2), the Green's function for each source and receiver are simulated. Assuming it takes 0.5 hrs to simulate one Green's function, it would take 50 servers 600 days to complete the acquisition illumination for the whole survey field, which is impractical.

In an embodiment of the current disclosure, in order to reduce the computational time and cost, a decimation is applied in the calculation to reduce the receiver locations used in the calculation. The decimation may reduce the number of receiver locations in the X-direction, the Y-direction, or both. With decimated receivers, the acquisition illumination for a single shot can be calculated with much small number of receivers, as shown in equation (3):

$$D_{s_i} \approx G_{s_i}^2 * \sum_{j=1}^{\frac{Nri}{mx*my}} (G_{r_j}^2) \quad (3)$$

Here $D_{s_i}$ is the illumination for a single shot which is a 3D volume having a grid size (Nx, Ny, Nz) in the xyz coordinate system. $G_{si}$ and $G_{rj}$ are respectively the Green's functions of the source location and the Green's function of the receivers in the same 3D volume. $Nr_i$ is the total number of receivers in the same 3D volume. $m_x$ and $m_y$ are the decimation factors in X- and Y-directions, respectively.

Figure 4:
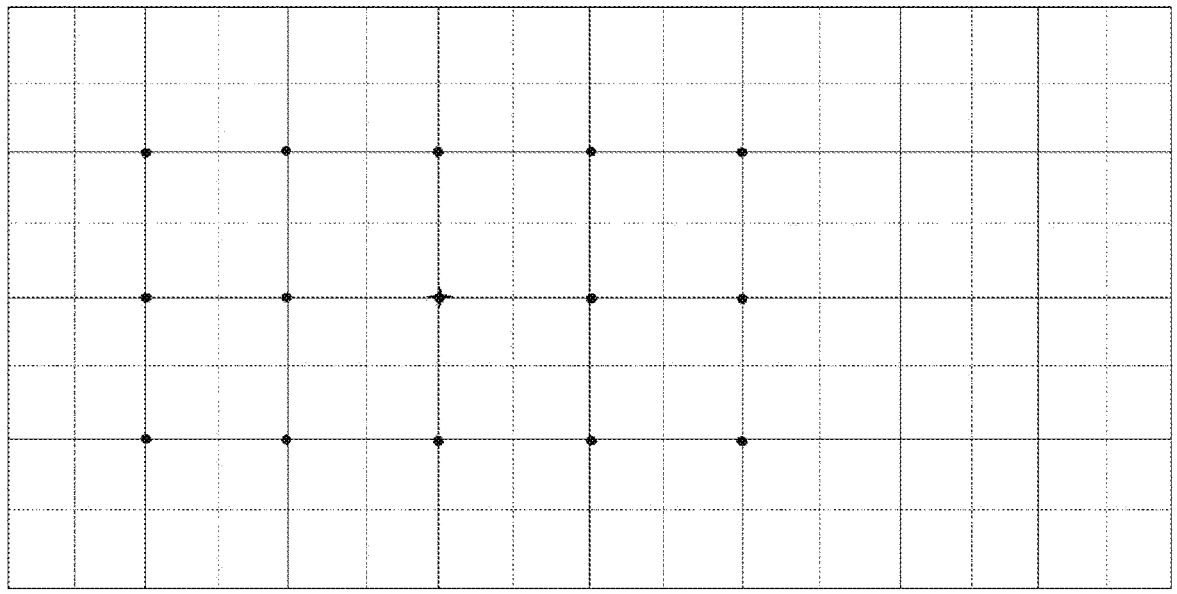
FIG. 4 is the source and decimated receiver location map for a single shot in a seismic acquisition system.

FIG. 4 illustrates an example in which the decimation factors $m_x=2$ and $m_y=2$ are applied to the case shown in FIG. 3. Using the 900-square km survey as an example, if the source and receivers are decimated to 50 m interval from 25 m internal, one out of four receivers, including the zero-offset receivers, are calculated for their Green's functions. Accordingly, the total computation time would be reduced to 150 days from 600 days.

In a further embodiment of the instant disclosure, the method of acquisition illumination is further decimated. The Green's function at a source location is the same as the Green's function of the zero-offset receiver at the same location, i.e., $G_{s_i}=G_{r_i}$. Therefore, the Green's function at the source location can be used to calculate both the source-side illumination and the receiver-side illumination.

Figure 5:
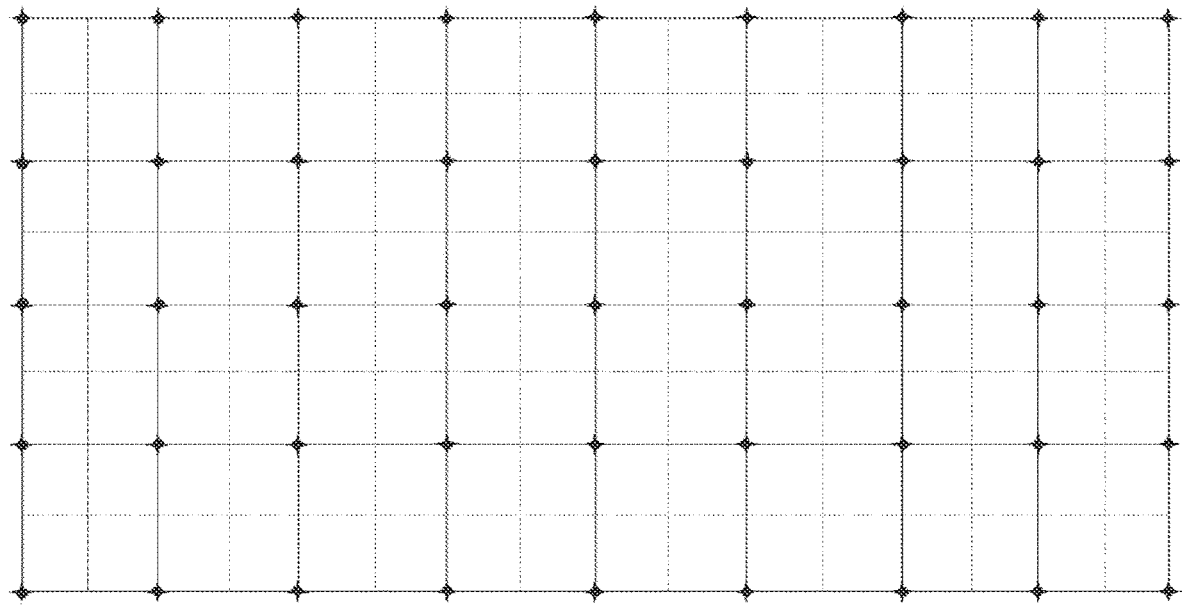
FIG. 5 is the source and decimated receiver location map for all the shots in a seismic acquisition system.

FIG. 5, in which each source location overlaps with a zero-offset receiver location, further illustrates this embodiment. Once all the Green's functions for source locations are calculated, the receiver-side illumination can be generated using only the zero-offset receivers. Accordingly, equation (3) can be expressed as equation (4) below:

$$D_{s_i} \approx G_{s_i}^2 * \Sigma_{j=1}^{Nsi}(G_{s_j}^2) \quad (4)$$

$G_{si}$ is the Green's function of the source which covers the 3D volume having the size (Nx, Ny, Nz). $Ns_i$ is the number of shots deployed in the same 3D volume during the survey. $G_{s_j}$ is the Green's function of each shot deployed in the same 3D volume. Illumination acquisition for the whole survey is then computed according to equation (2).

Using the 900 square km-survey as an example, according the method of this embodiment, only the Green's functions of the source locations (the same as the locations of the zero-offset receivers) are calculated, i.e., $N_s=9,000$ instead of 1.44 million, the total computation time is reduced to 37.5 days.

In another embodiment, when the RTM is used to process seismic data, all the source wavefields are calculated in RTM, providing the Green's function for each of the source locations in the entire survey field. These Green's functions are used to generate the acquisition illumination according to the decimated illumination equation (4), which takes practically zero computation time.

While in the foregoing specification this disclosure has been described in relation to certain preferred embodiments thereof, and many details have been set forth for purpose of illustration, it will be apparent to those skilled in the art that the disclosure is susceptible to alteration and that certain other details described herein can vary considerably without departing from the basic principles of the disclosure. In addition, it should be appreciated that structural features or method steps shown or described in any one embodiment herein can be used in other embodiments as well.

What is claimed is:

1. A method for obtaining seismic acquisition illumination, comprising:
   placing a plurality of source locations and a plurality of receivers in a survey field, wherein the plurality of receivers comprise one or more zero-offset receivers, each zero-offset receiver is placed at one of the plurality of source locations;
   deploying a plurality of shots in the survey field, each shot is deployed at one of the plurality of source locations and generates seismic waves that cover a volume of earth formation;
   collecting seismic signals from the volume of the earth formation using the plurality of receivers;
   calculating a source wavefield propagation for each of the plurality of source locations;
   calculating an illumination of each of the plurality of source locations according to the following equation:

$$D_{s_i} \approx G_{s_i}^2 * \Sigma_{j=1}^{Nsi}(G_{s_j}^2),$$

wherein $D_{s_i}$ is the illumination for shot number i among the plurality of shots, $G_{si}$ is the wavefield propagation of the source location at which shot number i is deployed, $Ns_i$ is the number of source locations positioned in the volume of earth formation, and $G_{sj}$ is the wavefield propagation of each source location positioned in the volume of earth formation; and
   summing up illuminations of all of the plurality of source locations to obtain an illumination of the survey field, wherein the illumination of the survey field is used to improve images outputted from a reverse time migration (RTM) process.

2. The method of claim 1, wherein the source wavefield propagation is represented by a Green's function.

3. The method of claim 1, wherein the source wavefield propagation for each of the plurality of source locations are simulated during reverse time migration (RTM) of seismic signals.

4. The method of claim 1, wherein the shot is generated by an explosive, a gas gun, an air guns, a weight drop mechanisms, or a vibrator system.

5. The method of claim 1, wherein the receiver is a geophone or a hydrophone.

6. A method for obtaining seismic acquisition illumination, comprising:
   placing a plurality of source locations and a plurality of receivers in a survey field, wherein the plurality of receivers comprise one or more zero-offset receivers, each zero-offset receiver is placed at one of the plurality of source locations;
   deploying a plurality of shots in the survey field, each shot is deployed at one of the plurality of source locations and generates seismic waves that cover a volume of earth formation;
   collecting seismic signals from the volume of earth formation using the plurality of receivers;
   applying one or more decimation factors to the plurality of receivers to obtained a set of decimated receivers;
   calculating a wavefield propagation for each of the set of decimated receivers;
   calculating an illumination of each of the plurality of source locations according to the following equation:

$$D_{s_i} \approx G_{s_i}^2 * \sum_{j=1}^{\frac{Nri}{mx*my}} (G_{r_j}^2)$$

wherein $D_{s_i}$ is an illumination for shot number i among the plurality of shots, the volume of earth formation has a grid size (Nx, Ny, Nz) in the xyz coordinate system, $G_{si}$ and $G_{rj}$ are respectively the wavefield propagation of the source location at which shot number i is deployed and the wavefield propagation of the receivers in the volume of earth formation, $Nr_i$ is a total number of receivers located in the volume of earth formation, $m_x$ and $m_y$ are decimation factors in X- and Y- directions, respectively; and
   summing up illuminations of all of the plurality of source locations to obtain an illumination of the survey field, wherein the illumination of the survey field is used to improve images outputted from a reverse time migration (RTM) process.

7. The method of claim 6, wherein $m_x$ and $m_y$ are integers larger than one, provided that a value of $$\frac{Nri}{mx*my}$$

is an integer of one or larger than one.

8. The method of claim 7, wherein $$\frac{Nri}{mx*my}$$

equals a number of zero-offset receivers in the volume of earth formation.

9. The method of claim 6, wherein the source wavefield propagation is represented by a Green's function.

10. The method of claim 6, wherein the wavefield propagation for each of the plurality of source locations are simulated during reverse time migration (RTM) of seismic signals.

11. The method of claim 6, wherein the shot is generated by an explosive, a gas gun, an air guns, a weight drop mechanisms, or a vibrator system.

12. The method of claim 6, wherein the receiver is a geophone or a hydrophone.

13. A method for calculating seismic acquisition illumination, comprising:
    conducting a seismic survey to collect seismic signals from a survey field, wherein the seismic survey deploys a plurality of shots at a corresponding number of source locations;
    performing reverse time migration (RTM) of seismic signals collected in the seismic survey;
    obtaining a wavefield propagation for each of the plurality of source locations;
    assigning the wavefield propagation for each of the plurality of source locations to be the wavefield propagation for a zero-offset receiver located at a corresponding source location;
    calculating an illumination of each of the plurality of source locations according to the following equation:

$$D_{s_i} \approx G_{s_i}^2 * \sum_{j=1}^{\frac{Nri}{mx*my}} (G_{r_j}^2)$$

wherein $D_{si}$ is an illumination for shot number i among the plurality of shots, the volume of earth formation has a grid size (Nx, Ny, Nz) in the xyz coordinate system, $G_{si}$ and $G_{rj}$ are respectively the wavefield propagation of the source location at which shot number i is deployed and the wavefield propagation of the receivers in the volume of earth formation, $Nr_i$ is a total number of receivers located in the volume of earth formation, $m_x$ and $m_y$ are decimation factors in X and Y directions, respectively; and summing up illuminations of all of the plurality of source locations to obtain an illumination of the survey field.

14. The method of claim 13, wherein $m_x$, and $m_y$ are integers larger than one, provided that a value of $$\frac{Nri}{mx*my}$$

is an integer of one or larger than one.

15. The method of claim 13, wherein $$\frac{Nri}{mx*my}$$

is a number of source locations in the volume of earth formation.

16. The method of claim 13, wherein the source wavefield propagation is represented by a Green's function.

17. The method of claim 15, wherein the wavefield propagation for each of the number of source locations in the 3D volume is obtained from the reverse time migration.

* * * * *